(12) United States Patent
Kasama et al.

(10) Patent No.: US 7,054,255 B2
(45) Date of Patent: May 30, 2006

(54) NEAR FIELD INFORMATION RECORDING/ REPRODUCTION APPARATUS HAVING WAVEGUIDE WITH REFLECTION SURFACE

(75) Inventors: Nobuyuki Kasama, Chiba (JP); Yoko Shinohara, Chiba (JP); Hidetaka Maeda, Chiba (JP); Yasuyuki Mitsuoka, Chiba (JP); Manabu Oumi, Chiba (JP); Kenji Kato, Chiba (JP); Takashi Niwa, Chiba (JP)

(73) Assignee: Seiko Instruments Inc., Chiba (JP)

( * ) Notice: Subject to any disclaimer, the term of this patent is extended or adjusted under 35 U.S.C. 154(b) by 625 days.

(21) Appl. No.: 10/068,450

(22) Filed: Feb. 7, 2002

(65) Prior Publication Data

US 2002/0114260 A1 Aug. 22, 2002

(30) Foreign Application Priority Data

Feb. 16, 2001 (JP) ........................... 2001-040589

(51) Int. Cl.
*G11B 7/00* (2006.01)
*G02B 6/34* (2006.01)

(52) U.S. Cl. ..................... 369/112.27; 385/36
(58) Field of Classification Search ............ 369/112.27, 369/112.01, 112.09, 44.15, 44.19, 112.04, 369/112.05; 385/36, 37, 140
See application file for complete search history.

(56) References Cited

U.S. PATENT DOCUMENTS 4,626,679 A * 12/1986 Kuwayama et al. ..... 369/44.12
5,351,229 A * 9/1994 Brezoczky et al. ........... 369/99
5,940,549 A * 8/1999 Wilde et al. ................. 385/15
5,982,409 A  11/1999 Hirokane et al. ........... 347/256
6,058,094 A * 5/2000 Davis et al. .............. 369/13.13
6,473,384 B1 * 10/2002 Oumi et al. ............ 369/112.27
6,631,227 B1 * 10/2003 Kasama et al. ........ 369/112.28

FOREIGN PATENT DOCUMENTS

| EP | 0549236 | | 6/1993 |
| EP | 0 996122 A1 | * | 4/2000 |
| EP | 1061510 | | 12/2000 |
| JP | 11265520 A | * | 9/1999 |
| JP | 2000163794 A | * | 6/2000 |
| JP | 00215494 | | 8/2000 |

* cited by examiner

*Primary Examiner*—George J. Letscher
*Assistant Examiner*—Christopher R Magee
(74) *Attorney, Agent, or Firm*—Adams & Wilks (57) ABSTRACT

A near-field optical head has a minute structure formed in the support member for interacting with a recording medium via near-field light. An optical waveguide is provided on the support member for guiding light between a light source and the minute structure. The optical waveguide has a core, a clad and a reflective surface, the core having an end face facing the reflective surface and being spaced therefrom so that light traveling through the optical waveguide is projected from the end face of the core onto the reflective surface and is reflected by the reflective surface toward the minute structure. Information is recorded to and/or read from the recording medium based on the scattering of near-field light between the recording medium and the minute structure while the near-field optical head is positioned over the surface of the recording medium.

15 Claims, 6 Drawing Sheets

NEAR FIELD INFORMATION RECORDING/REPRODUCTION APPARATUS HAVING WAVEGUIDE WITH REFLECTION SURFACE

BACKGROUND OF THE INVENTION

1. Field of the Invention

This invention relates to an information recording/reproduction apparatus for recording and reproducing information in a high density by utilizing a near field light emission device having a minute aperture for generating near field light, as a near field optical head.

2. Description of the Related Art

A near field light emission device has been utilized or examined at present as a near field optical head of an information recording/reproduction apparatus and as a probe for optically observing a sample.

Large capacity and small scale have been requisite for information recording/reproduction apparatuses using light and to achieve this object, higher density of a recording capacity has been necessary. Though research using a blue-violet semiconductor laser have been conducted, these technologies can improve only several times the recording density of the present level due to the problem of the diffraction limit of light. In contrast, an information recording/reproduction method utilizing near field light would be a promising method as a technology that handles optical information of a minute region exceeding the diffraction limit of the light.

This technology utilizes near field light generated in the proximity of an optical aperture having a size below the wavelength of light and formed in a near field optical head as a near field light emission device. In this way, the technology can handle optical information in a region below the wavelength of light which region is believed to be the limit in the conventional optical systems. Reproduction methods of the optical information include a method (collection mode method) that irradiates light to the surface of a recording medium and converts near field light locally existing at a minute mark to scattered light by the interaction with the minute aperture, and a method (illumination mode method) that irradiates near field light generated from the minute aperture to the surface of the recording medium and detects scattered light converted by the interaction with the surface of the recording medium the optical constants of which change, such as minute concavo-convexities on which the information is recorded, the refractive index, etc., by use of a light reception device disposed separately. Recording is made by a method (heat mode recording) that irradiates near field light generated from the minute aperture to the recording medium surface and changes the shape of the minute region on the medium, and a method (photon mode recording) that changes the refractive index or transmissivity of the minute region. Higher density than that of the conventional information recording/reproduction apparatuses can be achieved by use of the near field optical head having the minute optical aperture exceeding the diffraction limit of light.

The construction of the recording/reproduction apparatus using near field light is generally and substantially the same as that of magnetic disk apparatuses, and the apparatus uses the near field optical head in place of a magnetic head. The near field optical head having the minute optical aperture fitted to the distal end of a suspension arm is caused to float to a predetermined height in accordance with a flying head technology, and access is made to an arbitrary data mark existing on the disk. To let the near field optical head follow the disk rotating at a high speed, a flexure function is provided that stabilizes the posture of the head in such a fashion as to respond to swell of the disk.

A method of supplying light to the near field optical head having such a construction comprises the steps of connecting an optical fiber or an optical waveguide to the near field optical head, and irradiating a luminous flux from a laser as a light source to the minute aperture formed in the near field optical head.

In the information recording/reproduction apparatus described above, the luminous flux irradiated from an end face of the optical waveguide and having an expansion angle is reflected by a mirror, or the like, and is then irradiated to the minute aperture. Therefore, the energy density of light becomes low in the proximity of the minute aperture with the result that the intensity of near field light occurring in the proximity of the minute aperture becomes low, too.

Therefore, a lens is interposed between the end face of the optical waveguide and the minute apparatus so as to condense the luminous flux irradiated from the end face of the optical waveguide to a portion in the proximity of the minute aperture, to increase the intensity of near field light occurring in the proximity of the minute aperture and to improve light utilization efficiency. When a lens having a high NA is used, a condensation spot size can be made small and optical energy can be concentrated on a finer region. When the minute aperture is disposed at this condensation point, the intensity of near field light occurring in the proximity of the minute aperture can be increased and the luminous flux from the laser can be utilized efficiently.

In such an information recording/reproduction apparatus, however, the number of components such as optical waveguides, mirrors, and the like, increases. Since the number of positions to be adjusted increases, too, the drop of performance and the increase of the adjustment time as well as the production cost will occur.

In Japanese Patent Laid-Open No. 2000-215494, Ohkubo et al. provide an optical information recording/reproduction apparatus having the following extremely simple construction. The apparatus uses a substantially rod-like optical waveguide having flexibility. A reflection surface is disposed on the side of one of the ends of the optical waveguide to reflect at least a part of light propagating inside a core to a clad-transmitting direction. A light shading film for cutting off transmission of light is formed on the surface of a clad with the light transmission portion of light reflected on the reflection surface as a center. An aperture smaller than the wavelength of light to be used is formed by removing a part of the light shading film corresponding to the light transmission portion of light reflected by the reflection surface. In this way, a cantilever type optical pickup capable of generating near field light from the lower surface of the tip is accomplished.

The information recording/reproduction apparatus produced by discretely preparing and assembling the optical waveguide, the mirror, the lens, and the like, can generate sufficiently strong near field light by use of the minute aperture, and can accomplish recording and reproduction of ultra-high density information and a high signal-to-noise ratio (SN). However, because the optical guide (thin film optical waveguide, optical fiber, etc.), the mirror and the lens are necessary to efficiently guide the luminous flux from the light source to the minute aperture of the near field optical head having the minute aperture, the number of components increases. The increase of the number of the components results in the increase of the number of adjustment positions and in the increase of the production cost. Since the components thus increased invite the increase of the mass of the near field optical head, high-speed tracking becomes more difficult, and high-speed recording/reproduction of information becomes more difficult, too.

In the information recording/reproduction apparatus using the optical pickup of Japanese Patent Laid-Open No. 2000-215494 by Ohkubo et al, the luminous flux propagating inside the core of the optical waveguide is guided to the minute aperture by the reflection surface that reflects light in the clad-transmitting direction. However, because the luminous flux reflected from the core having the reflection surface towards the clad is guided to the minute aperture while it is being diverged with an expansion angle, the energy density of the luminous flux drops at the minute aperture, and sufficiently strong near field light cannot be generated in the proximity of the minute aperture. To highly improve the NA of the luminous flux incident into the minute aperture and to increase the energy density of the luminous flux at the minute aperture, a minute ball lens is interposed between the minute aperture and the core having the reflection surface formed thereon so that the energy density of the luminous flux guided to the minute aperture can be increased.

A high NA of the luminous flux incident into the minute aperture can be achieved by increasing the diameter of the luminous flux incident into the lens and by using a lens having a small focal distance. To increase the diameter of the luminous flux incident into the lens, it is necessary to secure a sufficient distance from the core end face to the lens.

The substantially rod-like optical guide having flexibility generally has a thickness of not greater than about 100 μm, and it is difficult to attain a high NA for increasing the energy density of the luminous flux incident into the minute aperture. It would be possible to attain a high NA of the luminous flux incident into the minute aperture by increasing the distance between the core having the reflection surface formed thereon and the ball lens, but when such an arrangement is employed, the optical waveguide loses its flexibility. In addition, since the optical pickup becomes thicker and the position of the center of gravity becomes higher, high-speed tracking becomes difficult to execute.

SUMMARY OF THE INVENTION

It is therefore an object of the present invention to provide an economical information recording/reproduction apparatus capable of guiding efficiently a luminous flux from a light source to a minute aperture while preventing the increase of the number of components, reducing a mass of a near field optical head, generating stronger near field light in the proximity of the minute aperture, and accomplishing high-speed recording/reproduction of information in a ultra-high density by conducting high-speed tracking.

According to a first aspect of the invention, a first information recording/reproduction apparatus according to the present invention includes a light source, a suspension arm, a flexure fixed to the suspension arm, a near field optical head having a minute aperture formed therein, a substantially rod-like optical waveguide having a core and a clad, a reflection surface formed on the side of one of the end faces of the optical waveguide, for irradiating light to the near field optical head, a light reception portion, and a recording medium, the apparatus utilizing near field light; wherein a lens function for a head is formed on the surface of the near field optical head different from the surface of the minute aperture, and a core end face is formed at an intermediate part of the optical waveguide.

It becomes therefore possible not only to conduct recording/reproduction of ultra-high density information by use of near field light but also to condense a luminous flux having a higher energy density to the minute aperture of the near field optical head. Consequently, the intensity of near field light generated in the proximity of the minute aperture becomes higher and utilization efficiency of light can be drastically improved. For this reason, a high output laser need not be used, the apparatus can be made compact in size, and an information recording/reproduction apparatus for achieving a high SN ratio of reproduction signals and high-speed recording/reproduction can be provided.

The reflection surface spaced apart from the core end face and the optical waveguide can be fabricated integrally. Therefore, positioning between the core end face and the reflection surface is not necessary and the number of components can be reduced. Consequently, an information recording/reproduction apparatus having a lower cost of production and capable of stabilizing the intensity of near field light generated in the proximity of the minute aperture can be provided.

According to a second aspect of the invention, a second information recording/reproduction apparatus according to the present invention has its feature in that the reflection surface is a plane having an angle of about 45 degrees to the core of the optical waveguide.

In addition to the effect of the first information recording/reproduction apparatus, the second information recording/reproduction apparatus according to the present invention has the construction in which the reflection surface is a slope having the angle of 45 degrees. Therefore, the optical axis of the luminous flux reflected by the reflection surface is perpendicularly incident into the lens formed in the near field optical head, and can be condensed to the minute aperture without aberration. Accordingly, the intensity of near field light generated in the proximity of the minute aperture becomes higher than when the angle of the reflection angle is other than 45 degrees, light utilization efficiency becomes high, power consumption and the size of the apparatus can be reduced, and a high SN ratio and high-speed recording/reproduction can be achieved.

Further, according to a third aspect of the invention, a third information recording/reproduction apparatus according to the present invention has its feature in that the core end face is provided with a lens function.

Therefore, in addition to the effect of the first information recording/reproduction apparatus of the present invention, the third information recording/reproduction apparatus has the mechanism in which the distal end portion of the core of the optical waveguide has the lens function of a convex or concave shape. Since this lens function is combined with the lens formed in the near field optical head, the third apparatus can much more condense the luminous flux having a high energy density to the minute aperture of the near field optical head, can further increase the intensity of near field light generated in the proximity of the minute aperture, and can drastically improve light utilization efficiency. Therefore, this apparatus can further reduce power consumption and the size of the apparatus, and can accomplish a higher SN ratio and higher speed recording/reproduction.

Further, according to a fourth aspect of the invention, a fourth information recording/reproduction apparatus according to the present invention has its feature in that the reflection surface is a plane such that an expansion angle of a luminous flux outgoing from the core end face becomes greater when reflected by the reflection surface.

Therefore, in addition to the effects of the first to third information recording/reproduction apparatuses of the present invention, the fourth information recording/reproduction apparatus has the construction in which the reflection surface of the optical waveguide has the concave shape that reflects the luminous flux and much more enlarges its expansion angle, and can therefore condense much more the luminous flux having a high energy density to the minute aperture of the near field optical head. Therefore, since the intensity of near field light generated in the proximity of the minute aperture can be further increased, light utilization efficiency can be further improved, power consumption and the size of the apparatus can be further reduced, and a high SN ratio and higher speed recording/reproduction can be accomplished.

Further, according to a fifth aspect of the invention, a fifth information recording/reproduction apparatus according to the present invention has its feature in that the optical waveguide further includes a flexure.

Therefore, in addition to the effect of the first information recording/reproduction apparatus of the present invention, the fifth information recording/reproduction apparatus has the construction in which the optical waveguide is provided with the flexure function. It is therefore possible to reduce the number of components, the time required for assembly and adjustment and the cost of production.

Further, according to a sixth aspect of the invention, a sixth information recording/reproduction apparatus according to the present invention has its feature in that a Fresnel lens accomplishes the lens function for a head described above.

In addition to the effect of the first information recording/reproduction apparatus of the present invention, the sixth information recording/reproduction apparatus can fabricate a thin near field optical head even if the lens diameter is enlarged, as a Fresnel lens is used for accomplishing the head lens function to be formed in the near field optical head. This apparatus can further achieve a higher NA of the luminous flux incident to the minute aperture, can reduce power consumption and the size of the apparatus, and can achieve a higher SN ratio and higher speed recording/reproduction. Moreover, since the Fresnel lens can be mass-produced, the cost of production can be lowered.

Further, according to a seventh aspect of the invention, a seventh information recording/reproduction apparatus according to the present invention has its feature in that the optical waveguide is an optical fiber having a transparent layer having a reflection surface.

In addition to the effect of the first information recording/reproduction apparatus of the present invention, the seventh information recording/reproduction apparatus uses the optical fiber equipped with the transparent layer having the reflection surface for the optical waveguide. Therefore, this apparatus is free from the limitation that the length of the optical waveguide is determined by the size of the substrate. Therefore, the length of the optical waveguide can be changed when the length of the optical fiber is changed, and the laser as the light source can be arranged at a desired position.

Further, the number of optical waveguides with the reflection surface that can be obtained from one substrate can be increased, and the cost of production can be further reduced easily.

DESCRIPTION OF THE PREFERRED EMBODIMENTS

Hereinafter, an information recording/reproducing apparatus according to the present invention will be explained in detail with reference to the accompanying drawings.
(Embodiment 1)

Figure 1:
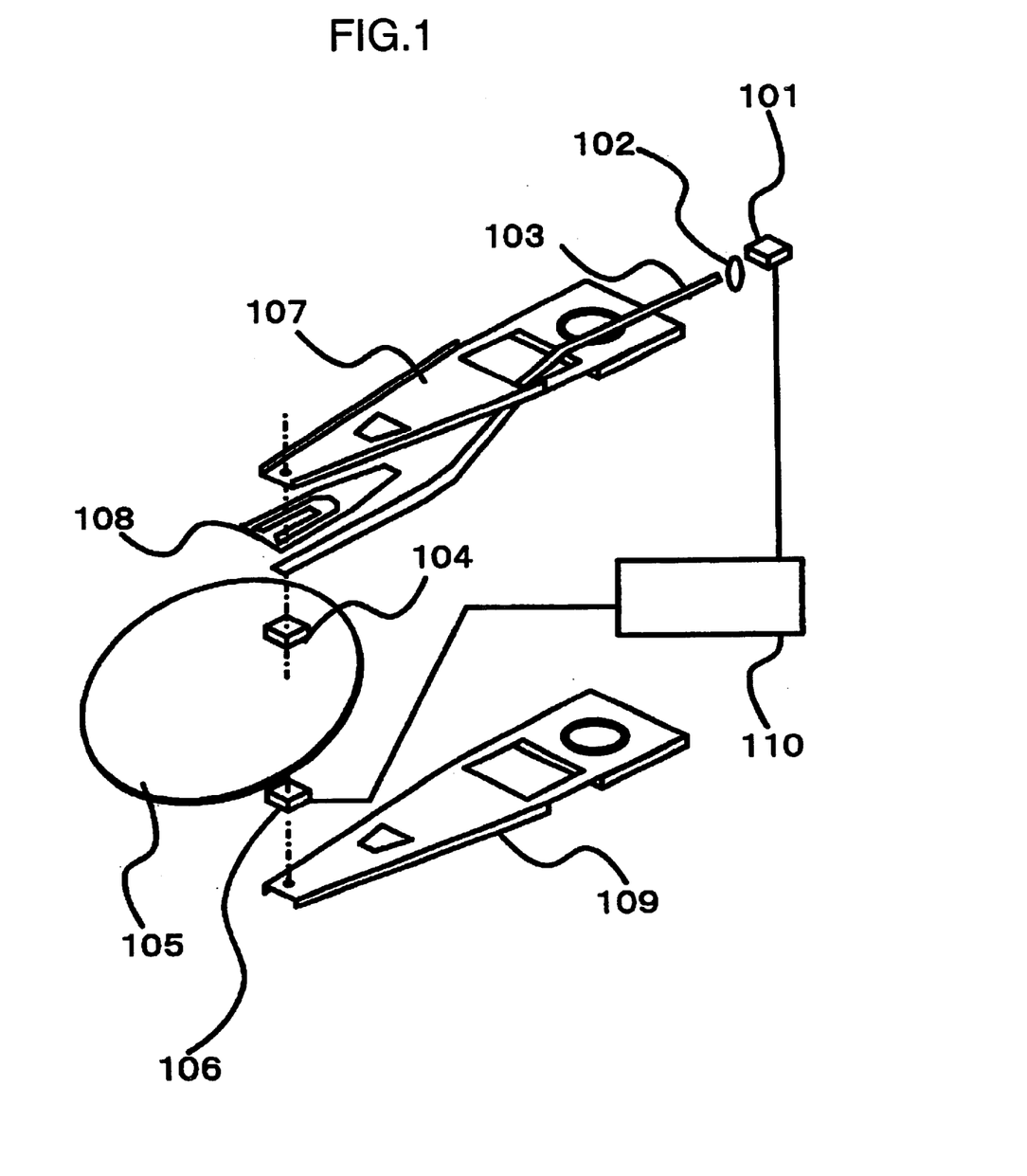
FIG. 1 is an explanatory view of an optical information recording/reproduction apparatus according to Embodiment 1 of the present invention.

FIG. 1 explains a construction of an information recording/reproduction apparatus according to Embodiment 1 of the present invention.

The information recording/reproduction apparatus according to this embodiment has substantially the same basic construction as that of a conventional magnetic disk apparatus. While a near field optical head 104 having a minute aperture (not shown) for generating near field light is kept close to the surface of a recording medium 105 in a distance of dozens of nanometers, the recording medium 105 is rotated at a high speed. In this case, to let the near field optical head 104 float up while keeping always a predetermined relative arrangement with the recording medium 105, a flexure 108 is fitted to the distal end portion of a suspension arm 107. The suspension arm 107 is allowed to move in a radial direction of the recording medium 105 by a voice coil motor (not shown). Here, the near field optical head 104 is arranged in such a fashion that the minute aperture opposes the recording medium 105.

To guide a luminous flux from a laser 101 to the near field optical head 104, an optical waveguide 103 that comprises a lens 102, and a core and a clad fixed to the suspension arm 107 is employed. Intensity modulation may be imparted to the laser 101 by a circuit system 110, whenever necessary.

A light reception head 106 for reading the information recorded to the recording medium 105 is fitted to a suspension arm 109. This suspension arm 109 is fitted to the same voice coil motor (not shown) as the suspension arm 107.

Next, the construction of the near field optical head according to Embodiment 1 will be explained.

Figure 2:
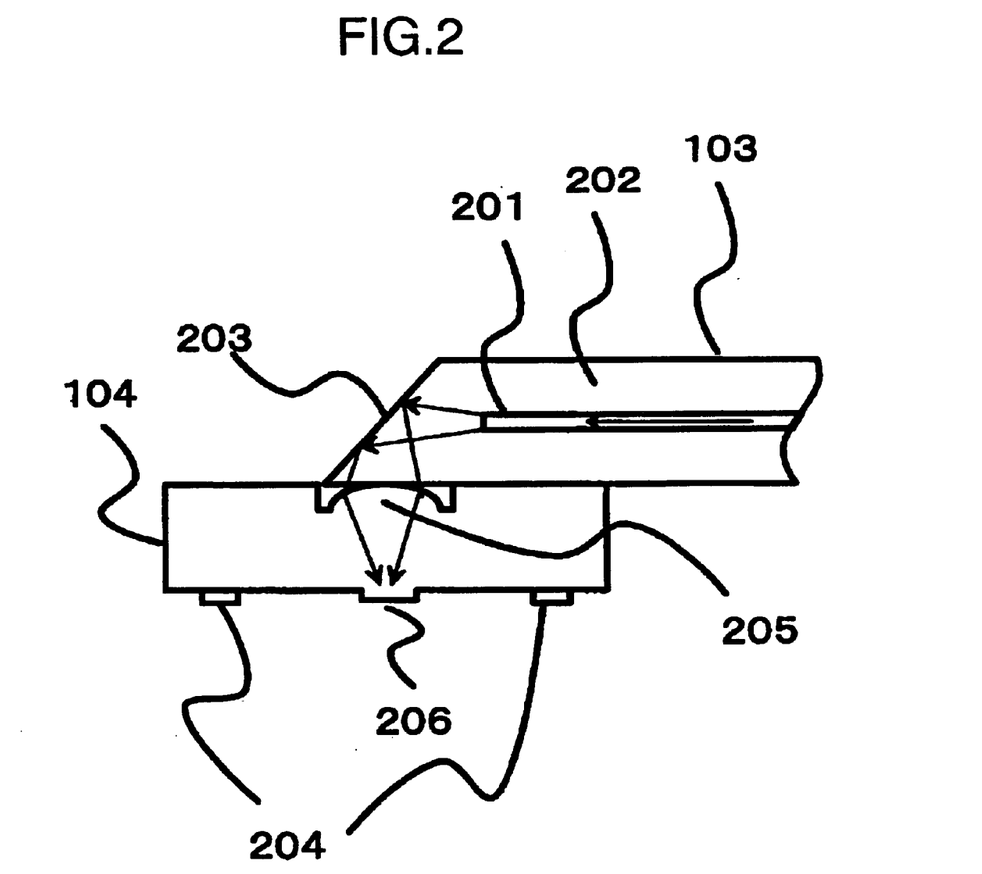
FIG. 2 is an explanatory view of a waveguide and a near field optical head of the optical information recording/reproduction apparatus according to Embodiment 1 of the present invention.

FIG. 2 explains the waveguide and the near field optical head of the information recording/reproduction apparatus according to Embodiment 1.

The near field head 104 includes a Micro-lens 205 formed on a transparent glass substrate, for example, so as to accomplish a lens function for the head, and an air bearing surface 204 formed on the side of the recording medium so that the head 104 can always float while keeping a predetermined relative arrangement. A shading film (not shown) covers the surfaces of the head 104 other than the surface on which the micro-lens 205 is formed. A minute aperture 206 is formed in the shading film on the bottom surface of the near field optical head 104. The micro-lens 205 condenses the luminous flux from the optical waveguide 103 to the minute aperture 206. The waveguide 103 comprising the core 201 and the clad 202 is fixed to the upper part of this near field optical head 104.

This embodiment uses the glass substrate that permits transmission of light at the wavelength of the laser used as the substrate for forming the near field optical head 104. However, a silicon substrate, or the like, and a material permitting transmission of light at the wavelength used for only the micro-lens 205 and for the portion through which the luminous flux transmits may be used to form the near field optical head 104.

The micro-lens 205 may be an ordinary spheric or aspheric lens, a refractive index distribution type lens or a Fresnel lens. Particularly when the Fresnel lens is used, a lens having a planar shape can be fabricated, and even when a lens having a large diameter is formed, the thickness of the near field optical head can be reduced. The Fresnel lens can be mass-produced by using a photolithography technology.

Next, the optical waveguide used in Embodiment 1 will be explained.

Figure 3A:
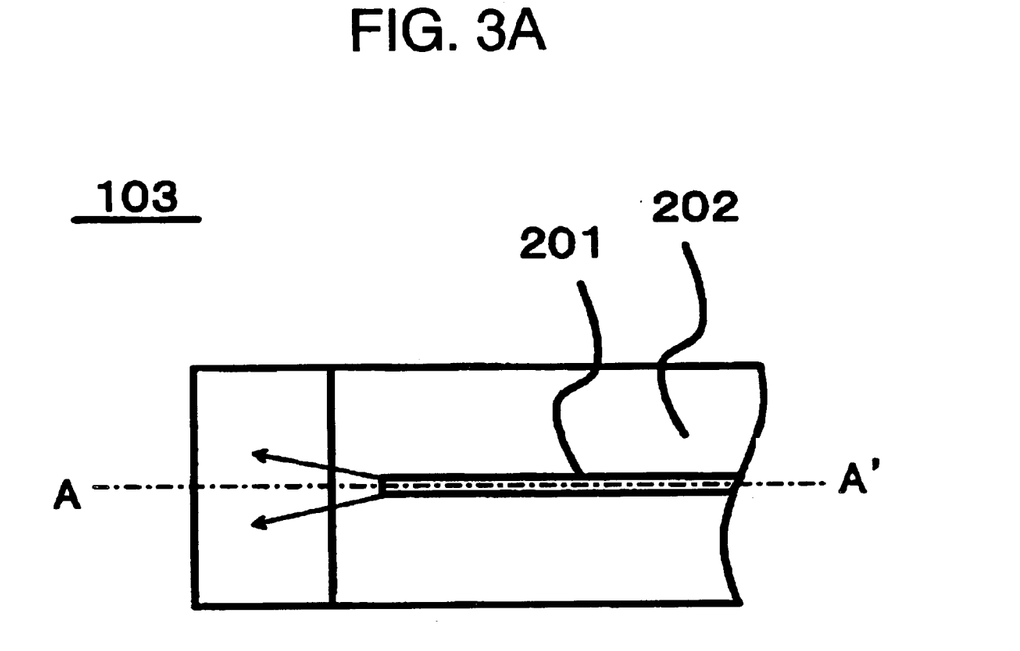
FIG. 3 is an explanatory view of a shape of the optical waveguide according to Embodiment 1 of the present invention.
Figure 3B:
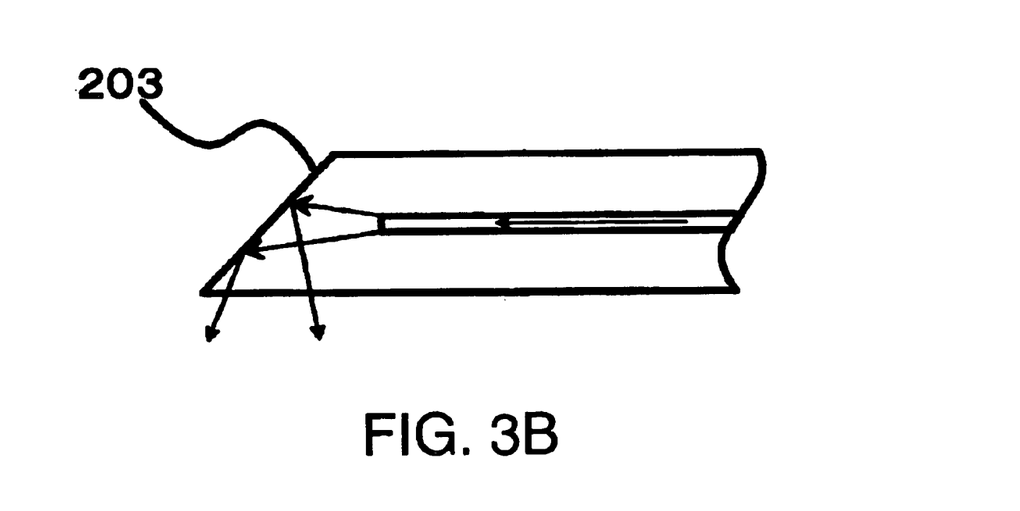

FIG. 3 explains the shape of the optical waveguide used in Embodiment 1. FIG. 3A is a top view of the optical waveguide. FIG. 3B is a sectional view taken along a line AA' in FIG. 3A.

The optical waveguide 103 comprises the core 201 and the clad 202, and the reflection surface 203 for irradiating light to the near field optical head 104 is formed on one of the end faces of the optical waveguide 103. Here, a reflection film is formed on the reflection surface 203, whenever necessary.

The core 201 of the optical waveguide 103 terminates at an intermediate part of the optical waveguide 103 and a core end face exists on the side of the reflection surface 203. The region from the core end face to the reflection surface 203 is made of the same material as that of the clad 202. The luminous flux propagating through the core 201 outgoes to the medium having the same refractive index as that of the clad 202 on the end face of the core 201, is reflected on the reflection surface 203 as a divergent luminous flux having a certain expansion angle and is irradiated to the near field optical head.

Referring to FIG. 2, the divergent luminous flux having the expansion described above is condensed to the minute aperture 206 by the micro-lens 205 formed on the near field optical head 104. Since the core 201 terminates at the intermediate part of the optical waveguide 103, the distance from the core end face to the micro-lens 205 can be elongated and the radius of the luminous flux irradiated to the micro-lens 205 can be increased. Thereafter, the micro-lens 205 condenses the luminous flux to the minute aperture 206 and a high NA of the luminous flux incident into the minute aperture 206 can be attained. Since the high NA can be attained, the spot size of the luminous flux condensed to the minute aperture 206 can be decreased and the luminous flux having a high energy density can be thus irradiated. In consequence, the intensity of near field light generated in the proximity of the minute aperture 206 can be increased.

In this embodiment, the distance from the core end face to the microlens 205 can be set to about 1 mm, for example. Assuming that the expansion angle of the luminous flux outgoing from the core 201 on the core end face is NA=0.1, the micro-lens 205 expands the luminous flux to a radius of about 100 µm. When the thickness of the near field optical head 104 is 400 µm and the refractive index of glass forming the near field optical head is 1.7, the NA of the luminous flux incident into the minute aperture 206 is at least 0.4. Consequently, the luminous flux is condensed to the minute aperture 206, the energy density becomes high and the intensity of near field light generated in the proximity of the minute aperture 206 becomes high.

When a Fresnel lens is used as the micro-lens 205, a thin near field optical head can be fabricated even when the lens diameter is increased. As the distance between the lens surface and the minute aperture is reduced, the NA of the luminous flux incident into the minute aperture can be further increased.

Next, a method of reproducing and recording the information recorded on the recording medium 105 will be explained with reference to FIGS. 1 and 2.

Referring to FIG. 1, the near field optical head 104 having the minute aperture fitted to the distal end of the suspension arm 107 is allowed to float to a predetermined height by the flying head technology to thereby gain access to an arbitrary data mark existing on the recording medium 105. In order to let the near field optical head 104 follow the recording medium 105 rotating at a high speed, the function of a flexure 108 is provided for stabilizing the posture to cope with swell of the recording medium 105. The luminous flux outgoing from the laser 101 is allowed to be incident into the optical waveguide 103 by the lens 102 and is guided to the near field optical head 104.

The core 201 of the optical waveguide 103 terminates at the intermediate part of the optical waveguide 103, and the core end face exists on the side of the reflection surface 203. The region from the core end face to the reflection surface 203 is made of the same material as that of the clad 202. The luminous flux propagating through the core 201 outgoes to the medium having the same refractive index as that of the clad 202 on the core end face, is reflected by the reflection surface 203 as the luminous flux having a certain expansion angle and is irradiated to the near field optical head.

As explained already, the core 201 terminates at the intermediate part of the optical waveguide 103 and the core end face is formed as shown in FIG. 3. Therefore, the distance to the micro-lens 205 can be elongated and the radius of the luminous flux irradiated to the micro-lens 205 can be increased. The luminous flux is thereafter condensed by the micro-lens 205 to the minute aperture 206, and the luminous flux having a high energy density can be irradiated to the minute aperture. Consequently, the intensity of near field light generated in the proximity of the minute aperture 206 can be increased.

The light reception head 106 fixed to the suspension arm 109 receives scattered light generated as a result of the interaction between near field light and the recording medium 105, converts scattered light to an electric signal and transfers the signal to the circuit system 110. The signal is amplified, whenever necessary, and is used as an information reproduction signal.

Recording of the information to the recording medium 105 is conducted by moving the near field optical head 104 having the minute aperture to a desired position of the recording medium while the recording medium 105 and the minute aperture are kept close to each other, and irradiating near field light from the minute aperture to the recording medium 105 for the write operation.

In this embodiment, the near field optical head 104 for generating near field light and the light reception head 106 are fitted to the suspension arms, but it is also possible to integrate the near field optical head 104 with the light reception head 106 and to fit the assembly to one suspension arm.

Since this embodiment utilizes the interaction of near field light for recording and reproducing the information to and from the recording medium, recording and reproduction can be accomplished in the recording density exceeding the diffraction limit of light. Near field light generated from the minute aperture strongly depends on the distance from the minute aperture, and attenuates. However, since the near field optical head is allowed to follow the movement of the recording medium by the flexure structure in this embodiment, the interaction occurs always stably, and the signal output can be obtained always stably during recording and reproduction of the information.

This embodiment reproduces the information recorded on the recording medium by transmission but can be applied to the case where the information recorded-on the recording medium is reproduced by reflection such as in ordinary CD and DVD. In such a case, a near field optical head having a light reception device formed in the proximity of the minute aperture is employed.

Next, a fabrication method of the optical waveguide 103 used in this embodiment will be explained.

Figure 4:
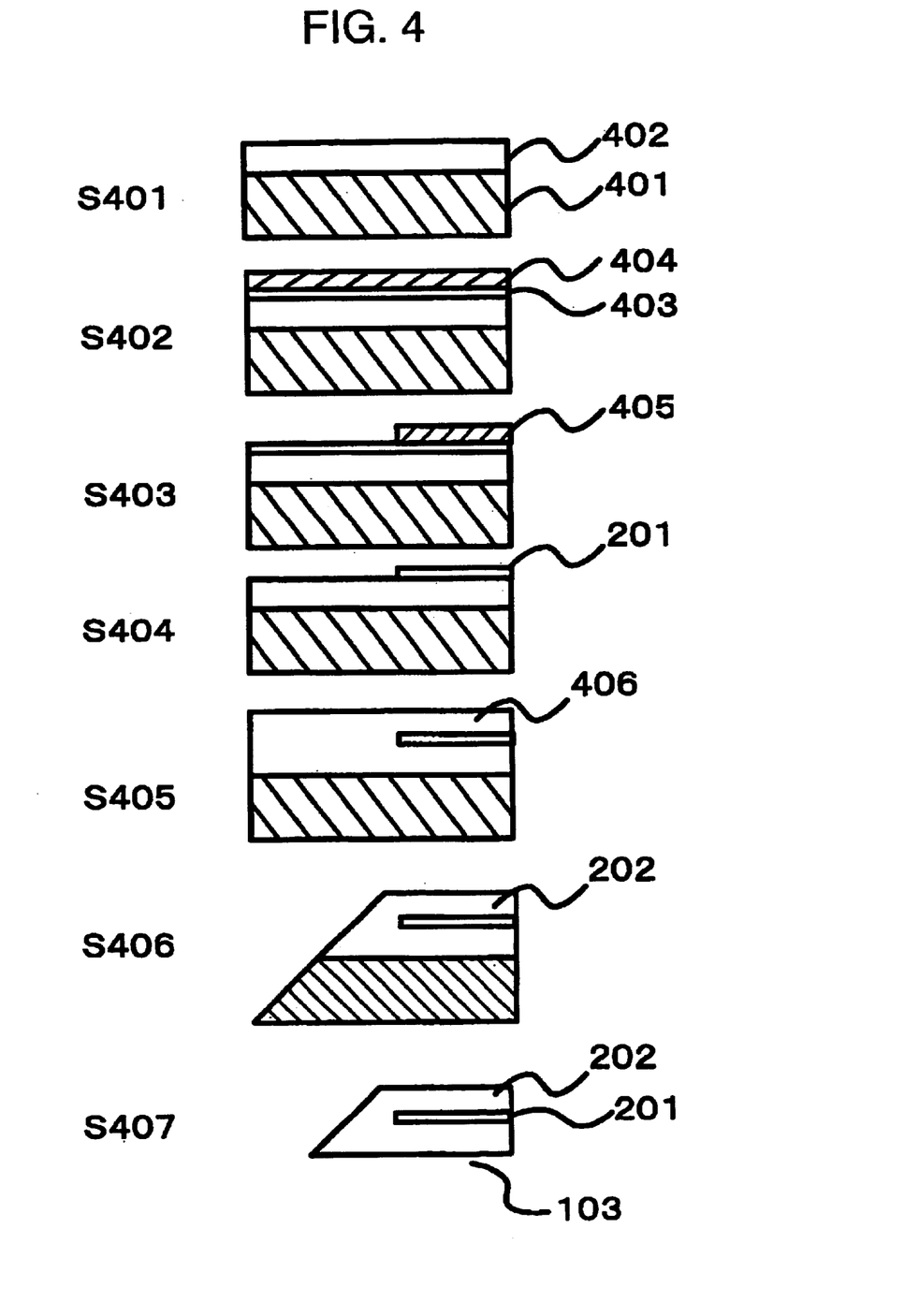
FIG. 4 is an explanatory view of a fabrication method of an optical waveguide.

FIG. 4 explains a fabrication method of the optical waveguide according to Embodiment 1.

First, in Step S401, a silicon substrate 401 is used as the substrate, and a quartz type material such as silicon oxide or silicon nitride, or a polymer dielectric material such as polyimide or polymethacrylic acid, as a low refractive index layer 402 that is to serve as a clad is deposited onto the silicon substrate 401. In the case of silicon oxide as the dielectric material, sputtering, CVD (Chemical Vapor Deposition), vacuum deposition, or the like, can be easily employed. The plastic material such as polyimide or polymethacrylic acid may be applied in the liquid plastic form and may then be cured and laminated. A glass substrate may be used, too, besides the silicon substrate 401, but the silicon substrate that is used generally and widely in the field of the semiconductor industry is employed in view of its high planarity, easy availability and low cost.

In the next Step S402, a high refractive index layer 403 having a higher refractive index than that of the low refractive index layer 402 and functioning as a core, is formed on the low refractive index layer 402 formed in Step S401 in the same way as described above. To increase the refractive index when the quartz type material such as silicon oxide is used, germanium may be doped during the film formation process. Further, a resist film 404 is formed on the high refractive index layer 403 by spin coating, or the like.

In Step S403, the resist film 404 is patterned as a mask material for forming the core shape by using the photolithography technology employed in the ordinary semiconductor fabrication process, forming a core-shaped resist 405.

In Step S404, the high refractive index layer 403 is etched by using the core-shaped resist 405 for forming the core, and the core-shaped resist 405 as the mask material is then removed, patterning the core 201.

In Step S405, a low refractive index layer 406 is formed in such a fashion as to cover the patterned core 201. In this way is formed an optical waveguide having a core end face at its intermediate part.

In Step S406, the silicon substrate 401 of the optical waveguide is diced in such a fashion that the end face of the optical waveguide describes an angle of 45 degrees to form a reflection surface. The optical waveguide 103 comprising the core 201 and the clad 202 is thus formed.

In the last Step S407, the silicon substrate 401 is removed, and the optical waveguide 103 in which the end face of the clad 202 has the angle of 45 degrees and the core 201 terminates at the intermediate part can be fabricated. A reflection film is formed on the reflection surface having the angle of 45 degrees, whenever necessary.

Dicing is employed in this embodiment to form the reflection surface having the angle of 45 degrees but besides dicing, a photolithography technology may be employed to isotropically etch the clad 202.

The angle of the reflection surface is preferably 45 degrees but this angle is not particularly restrictive. When the reflection surface has the angle of 45 degrees, however, the optical axis of the luminous flux reflected by the reflection surface is perpendicularly incident into the micro-lens formed in the near field optical head and can be condensed to the minute aperture without aberration. In consequence, the intensity of near field light generated in the proximity of the minute aperture becomes higher than when the angle of the reflection surface is other than 45 degrees.

As explained above, the information recording/reproduction apparatus of this embodiment can achieve recording and reproduction of ultra-high density information by use of near field light, and can condense the luminous flux having a high energy density to the minute aperture of the near field optical head by combining together the optical waveguide comprising the core and the clad, the reflection surface spaced apart from the core end face and the micro-lens formed in the near field optical head. Further, this apparatus can increase the intensity of near field light generated in the proximity of the minute aperture and can drastically improve light utilization efficiency. Therefore, the apparatus of this embodiment eliminates the necessity for using a high output laser, can suppress exothermy resulting from the laser, and can reduce power consumption and the size of the apparatus.

Because the apparatus of this embodiment can improve the intensity of scattered light resulting from the interaction with the recording medium incident into the light reception head, it can achieve a high SN ratio of the reproduction signal and can execute high-speed reproduction.

In addition, the optical waveguide comprising the core and the clad and the reflection surface spaced apart from the core end face can be fabricated integrally as an optical waveguide, in which the core end face exists on the side of the reflection surface, by terminating the core at the intermediate part of the optical waveguide. Therefore, positioning between the core end face and the reflection surface is not necessary and the number of components can be decreased. Therefore, the cost of the apparatus can be further reduced and the intensity of near field light generated in the proximity of the minute aperture can be stabilized. Consequently, this embodiment can provide an information recording/reproduction apparatus capable of conducting high-speed recording of information to a recording medium.

When the reflection surface is a slope having an angle of 45 degrees, the optical axis of the luminous flux reflected by the reflection surface is perpendicularly incident into the micro-lens formed in the near field optical head, and can be condensed to the minute aperture without aberration. Therefore, the intensity of near field light generated in the proximity of the minute aperture becomes higher than when the angle of the reflection surface is other than 45 degrees, utilization efficiency of light becomes higher, power consumption as well as the size of the apparatus can be reduced, and a high SN ratio and high-speed recording/reproduction can be achieved.

Further, when the lens function of the head of the near field optical head is achieved by use of the micro-lens, a thin near field optical head can be fabricated even when the lens diameter is increased, and a higher NA of the luminous flux incident into the minute aperture can be achieved by decreasing the distance between the lens surface and the minute aperture, power consumption and the size of the apparatus can be further reduced, and a higher SN ratio as well as high-speed recording/reproduction can be accomplished. Moreover, because a Fresnel lens can be mass-produced, the cost of the apparatus can be lowered.

Furthermore, because the optical waveguide is provided with the flexure function, the number of components and the time of assembly and adjustment can be further reduced.

(Embodiment 2)

Figure 5:
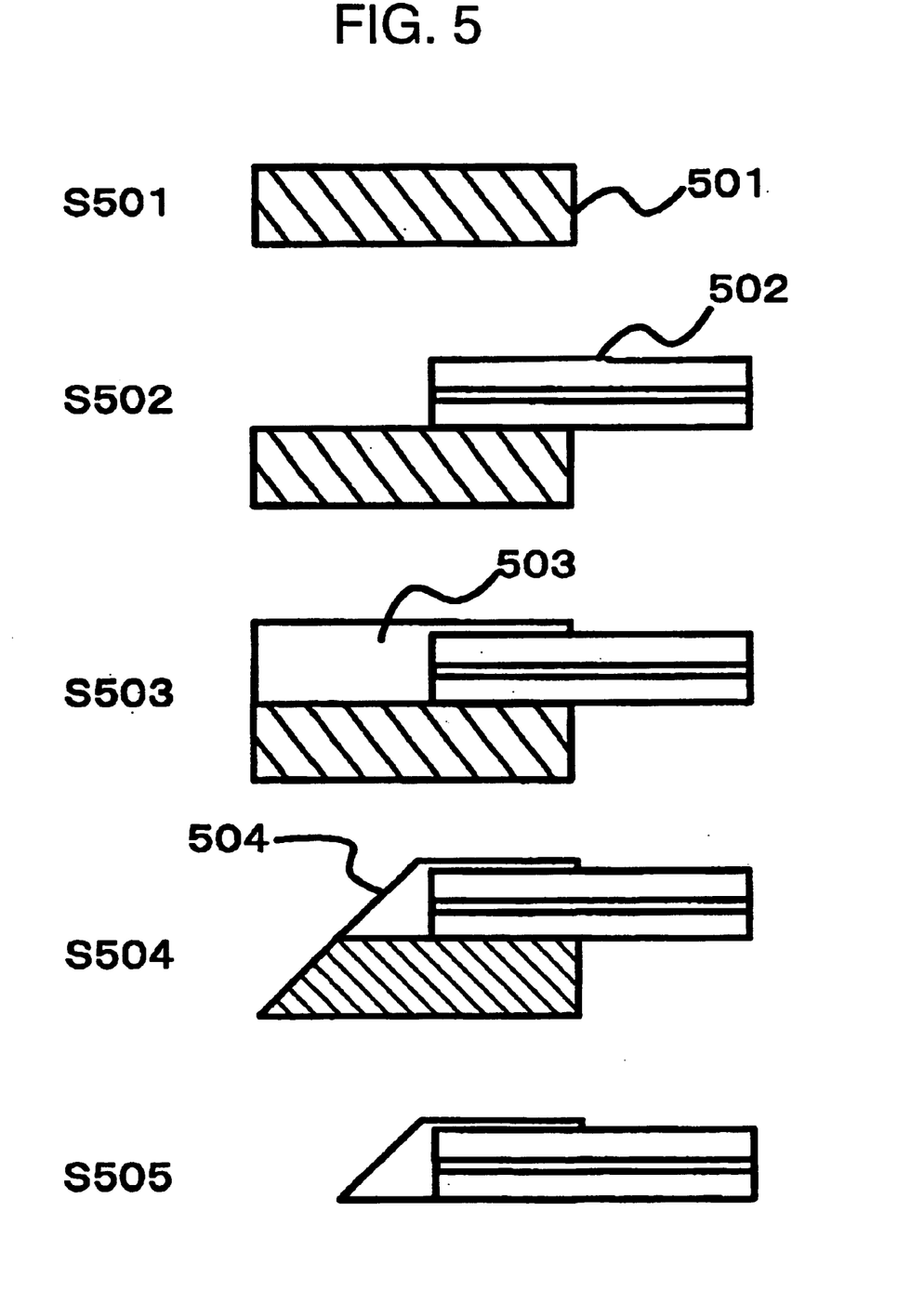
FIG. 5 is an explanatory view of another fabrication method of an optical waveguide according to Embodiment 2 of the present invention.

FIG. 5 explains a method of fabricating another optical waveguide used in an information reproduction apparatus according to Embodiment 2 of the present invention. This embodiment uses another optical waveguide in place of the optical waveguide used in Embodiment 1, and the rest of the constructions are the same as that of Embodiment 1. Therefore, the explanation will be partly omitted or simplified.

In FIG. 5, in the first Step S501, a silicon substrate 501 is used for the substrate. Though a glass substrate, or the like, may be used for the substrate besides the silicon substrate 501, this embodiment uses the silicon substrate generally and widely used in the field of the semiconductor industry in view of its planarity of the substrate, easy availability and cost.

In the next Step S502, an optical fiber 502 is fixed to the silicon substrate 501.

In Step S503, a transparent layer 503 is deposited to the optical fiber 502 fixed to the silicon substrate 501 to a thickness substantially equal to the thickness of the optical fiber 502. The quartz material such as silicon oxide or silicon nitride, or the polymer dielectric material such as polyimide or polymethacrylic acid, used in Embodiment 1 shown in FIG. 4, can be used as the material to be deposited. The refractive index of this transparent layer 503 is preferably set to the value approximate to the refractive index of the core of the optical waveguide 502 so as to minimize reflection on the end face of the optical fiber.

In the next Step S504, the silicon substrate 501 is diced so that the transparent layer 503 describes an angle of 45 degrees to the optical fiber 502 to form a reflection surface 504.

In the last Step S505, the silicon substrate 501 is removed, and the optical fiber can be fabricated in which the reflection surface 504 has the angle of 45 degrees to the optical fiber, and the core of the optical fiber 502 terminates at an intermediate part to provide the reflection surface. A reflection film is formed on the reflection surface having the angle of 45 degrees, whenever necessary.

Here, dicing is used to form the reflection surface having the angle of 45 degrees. Besides the dicing method, it is possible to isotropically etch the transparent layer 503 by the photolithography technology.

The construction of other portions and the method of recording and reproducing the information are exactly the same as those of Embodiment 1. Therefore, the explanation will be omitted.

As explained above, the information recording/reproduction apparatus of this embodiment uses the optical fiber having the transparent layer having the reflection surface of 45 degrees in the optical waveguide in addition to the effect of Embodiment 1. Therefore, the apparatus of this embodiment is free from the problem of the fabrication method of the optical waveguide of Embodiment 1 shown in FIG. 4 in that the size of the substrate determines the length of the optical waveguide. However, this embodiment can change the length of the optical waveguide by changing the length of the optical fiber. Therefore, the laser as the light source can be arranged at an arbitrary position.

In Embodiment 1, further, when the length of the optical waveguide is set to the length such that it can be accommodated in the substrate size, the number of the optical waveguides that can be simultaneously formed from one substrate becomes small. In this embodiment, however, the number of the optical waveguides with the reflection surface that can be formed from one substrate can be increased, and the cost of production can be further reduced easily.

(Embodiment 3)

Next, an information recording/reproduction apparatus according to Embodiment 3 of the present invention will be explained. This embodiment represents the case where the shape of the core end face of the optical waveguide in Embodiment 1 is changed. Therefore, the explanation of the same portion as that of Embodiment 1 will be partially omitted or simplified.

Figure 6:
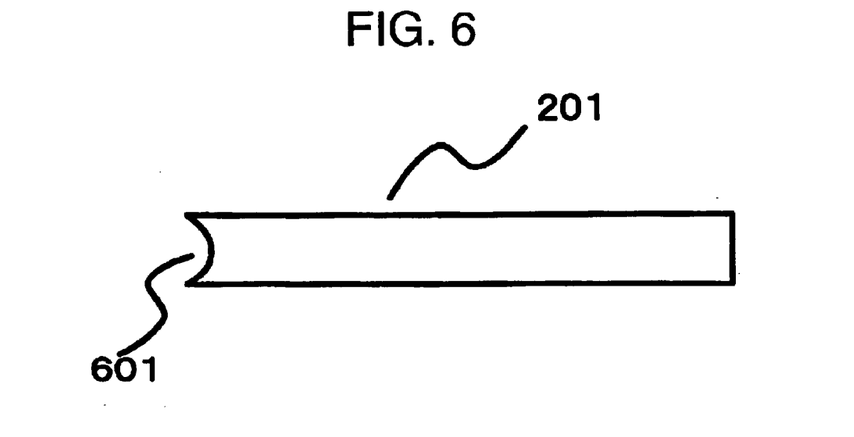
FIG. 6 is an explanatory view of a shape of an optical waveguide (core) according to Embodiment 3 of the present invention.

FIG. 6 shows the shape of the optical waveguide (core portion) in the information recording/reproduction apparatus in Embodiment 3.

In Embodiment 1, the shape of the core end face of the optical waveguide is planar but in Embodiment shown in FIG. 6, the shape of the end face of the core 201 is shaped into concave distal end portion 601 having a lens function. Because the core end face is the concave distal end portion 601, the expansion angle of the luminous flux outgoing from the core 201 becomes greater than when the core end face is planar, and the diameter of the luminous flux incident into the micro-lens formed in the near field optical head becomes further greater.

Figure 7:
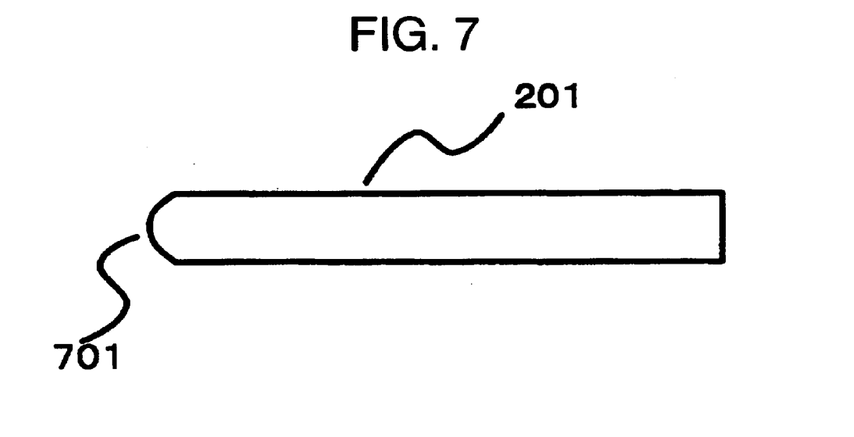
FIG. 7 is an explanatory view of a shape of another optical waveguide (core) according to Embodiment 3 of the present invention.

FIG. 7 shows the shape of another optical waveguide (core portion) in the information recording/reproduction apparatus according to Embodiment 3.

In this embodiment, the shape of the end face of the core 201 is shaped into a convex distal end portion 701 having a lens function. Since the core end face is shaped into the convex distal end portion 701, the luminous flux outgoing from the core 201 is once condensed and is then incident into the micro-lens while diverging. In comparison with the case where the core end face is planar, the diameter of the luminous flux incident into the micro-lens becomes greater provided that the distance from the core end face to the micro-lens remains the same.

When the shape of the core end face of the optical waveguide used for the information recording/reproduction apparatus is the one shown in FIG. 6 or 7, the diameter of the luminous flux incident into the micro-lens formed in the near field optical head becomes further greater than when the core end face is planar. Then, the NA of the luminous flux incident from the micro-lens into the minute aperture becomes further greater, and the spot size of the luminous flux at the minute aperture can be made further smaller. In consequence, the energy density condensed to the minute aperture becomes further greater and the intensity of near field light generated in the proximity of the minute aperture can be further increased.

This embodiment uses the convex or concave distal end portion having the lens function for the core end face, but the same effect can be obtained by forming a distal end portion having a lens function such as a refractive index distribution type lens besides these shapes.

Since the constructions of other portions and recording/reproduction of the information are exactly the same as those of Embodiment 1, the explanation will be omitted.

As explained above, the information recording/reproduction apparatus according to this embodiment employs the construction in which the core distal end portion of the optical waveguide has the convex or concave lens function. Therefore, in addition to the effect of the information recording/reproduction apparatus of Embodiment 1, the apparatus of this embodiment can condense the luminous flux having a high energy density to the minute aperture of the near field optical head by combining this lens function with the micro-lens formed in the near field optical head, and can further increase the intensity of near field light generated in the proximity of the minute aperture. Consequently, because utilization efficiency of light can be drastically improved, the apparatus of this embodiment can further reduce power consumption and the size of the apparatus, and can achieve a high SN ratio and high-speed recording and reproduction.

(Embodiment 4)

Next, an information recording/reproduction apparatus according to Embodiment 4 of the present invention will be explained. This embodiment represents the case where the shape of the reflection surface of the optical waveguide in Embodiment 1 is changed. Therefore, the explanation of the same portion as that of Embodiment 1 will be partially omitted or simplified.

Figure 8:
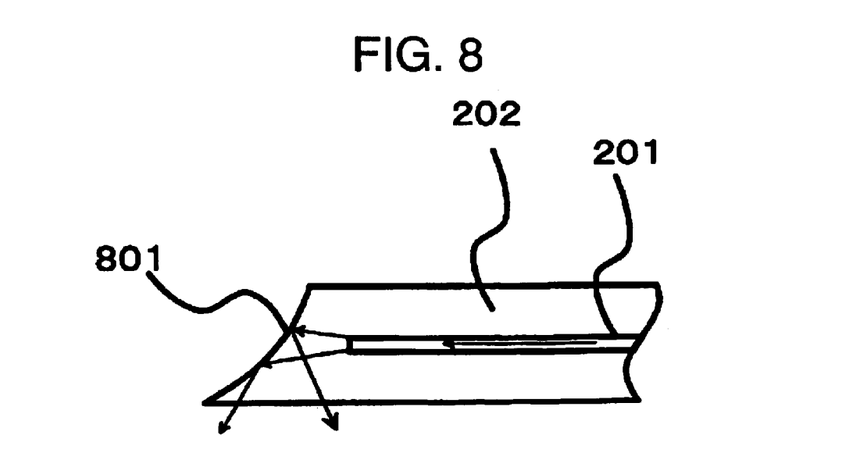
FIG. 8 is an explanatory view of a shape of another optical waveguide according to Embodiment 4 of the present invention.

FIG. 8 is a sectional view of the optical waveguide in the information recording/reproduction apparatus according to Embodiment 4. This optical waveguide is the same as the optical waveguide of Embodiment 1 shown in FIG. 3 with the exception that the reflection surface of the optical waveguide is a concave reflection surface 801 as a surface that enlarges the expansion angle of the luminous flux outgoing from the core end face by reflection.

The concave reflection surface 801 as the reflection surface of the optical waveguide reflects the luminous flux outgoing from the end face of the core 201 and can further expand the expansion angle of the reflected luminous flux. Therefore, the diameter of the luminous flux incident into the micro-lens formed in the near field optical head can be increased much more than the diameter in Embodiment 1. Then, the NA of the luminous flux incident from the micro-lens into the minute aperture becomes further greater, and the spot size of the luminous flux at the minute aperture can be further reduced. Consequently, the energy density condensed to the minute aperture can be further increased, and the strength of near field light generated in the proximity of the minute aperture can be further increased.

Such a shape of the reflection surface can be formed by dicing a blade-like shape into the same shape as that of the reflection surface. Etching can also be employed to form the shape of the reflection surface.

The concave reflection surface 801 can also be applied to the case where the optical fiber is used as in Embodiment 2 and to the case where the core end face is not planar as in Embodiment 3.

In this embodiment, the shape of the reflection surface is the concave reflection surface but besides this shape, a reflection type diffraction grating, or the like, may be formed to obtain the same effect so long as it has a structure that expands the expansion angle of the luminous flux incident to the reflection surface.

The constructions of other portions and recording/reproduction of the information are exactly the same as those of Embodiment 1, and the explanation will be therefore omitted.

In addition to the effect of the information recording/reproduction apparatus of Embodiments 1 to 3, the information recording/reproduction apparatus of this embodiment can condense the luminous flux having a high energy density at the minute aperture of the near field optical head by forming the reflection surface of the optical waveguide into the shape that expands the expansion angle of the luminous flux outgoing from the core end surface, and can further strengthen the intensity of near field light generated in the proximity of the minute aperture. Therefore, the apparatus of this embodiment can further improve light utilization efficiency and can achieve lower power consumption, a smaller size of the apparatus, a higher SN ratio and recording/reproduction at a higher speed.

As explained above, according to the first information recording/reproduction apparatus of the present invention, it is possible not only to conduct ultra-high density recording/reproduction of information by use of near field light, and to condense a luminous flux having a high energy density to a minute aperture of a near field optical head. Therefore, the intensity of near field light generated in the proximity of the minute aperture can be increased and light utilization efficiency can be drastically improved. Therefore, the present invention can provide an information recording/reproduction apparatus that does not require to use a laser having a high output, can suppress exothermy of the laser, can reduce power consumption and the size of the apparatus, and can achieve a high SN ratio of reproduction signals and high-speed recording.

Further, since the reflection surface spaced apart from the core end face and the optical waveguide can be fabricated integrally, positioning of the core end face and the reflection surface is not necessary, and the number of components can be decreased. Therefore, the present invention can provide an information recording/reproduction apparatus capable of reducing the cost and stabilizing the intensity of near field light generated in the proximity of the minute aperture.

In addition to the effect of the first information recording/reproduction apparatus, the second information recording/reproduction apparatus according to the present invention has the construction in which the reflection surface is a slope having an angle of 45 degrees. Therefore, the optical axis of the luminous flux reflected by the reflection surface is perpendicularly incident into the lens formed in the near field optical head, and can be condensed to the minute aperture without aberration. Accordingly, the intensity of near field light generated in the proximity of the minute aperture becomes higher than when the angle of the reflection angle is other than 45 degrees, light utilization becomes high, power consumption and the size of the apparatus can be reduced, and a high SN ratio and high-speed recording/reproduction can be achieved.

As explained above, in addition to the effect of the first information recording/reproduction apparatus of the present invention, the third information recording/reproduction apparatus has the mechanism in which the distal end portion of the core of the optical waveguide has the lens function of the convex or concave shape. Since this lens function is combined with the lens formed in the near field optical head, the third apparatus can much more condense the luminous flux having a high energy density to the minute aperture of the near field optical head, can further increase the intensity of near field light generated in the proximity of the minute aperture, and can drastically improve light utilization efficiency. Therefore, this apparatus can further reduce power consumption and the size of the apparatus and can accomplish a higher SN ratio and higher speed recording/reproduction.

As explained above, in addition to the effects of the first to third information recording/reproduction apparatuses of the present invention, the fourth information recording/reproduction apparatus has the construction in which the reflection surface of the optical waveguide has the concave shape that reflects the luminous flux and much more enlarges its expansion angle, and can therefore condense much more the luminous flux having a high energy density to the minute aperture of the near field optical head. Therefore, since the intensity of near field light generated in the proximity of the minute aperture can be further increased, light utilization efficiency can be further improved, power consumption and the size of the apparatus can be further reduced, and a high SN ratio and higher speed recording/reproduction can be accomplished.

As explained above, in addition to the effect of the first information recording/reproduction apparatus of the present invention, the fifth information recording/reproduction apparatus has the construction in which the optical waveguide is provided with a flexure function. It is therefore possible to reduce the number of components, the time for assembly and adjustment and the cost of production.

As explained above, in addition to the effect of the first information recording/reproduction apparatus of the present invention, the sixth information recording/reproduction apparatus can fabricate a thin near field optical head even if the lens diameter is enlarged, when a Fresnel lens is used for accomplishing the head lens function to be formed in the near field optical head. This apparatus can further achieve a higher NA of the luminous flux incident to the minute aperture, can reduce power consumption and the size of the apparatus, and can achieve a higher SN ratio and higher speed recording/reproduction. Moreover, since the Fresnel lens can be mass-produced, the cost of production can be lowered.

As explained above, in addition to the effect of the first information recording/reproduction apparatus of the present invention, the seventh information recording/reproduction apparatus uses the optical fiber equipped with the transparent layer having the reflection surface of the 45 degrees for the optical waveguide. Therefore, this apparatus is free from the limitation of the fabrication method of the optical waveguide used in Embodiment 1 as shown in FIG. 4 that the length of the optical waveguide is determined by the size of the substrate. Therefore, the length of the optical waveguide can be changed when the length of the optical fiber is changed, and the laser as the light source can be arranged at a desired position.

In Embodiment 1, when the length of the optical waveguide is set to a length such that the optical waveguide can be incorporated in the size of the substrate, the number of the optical waveguides that can be simultaneously fabricated from one substrate becomes small. In this embodiment, however, the number of optical waveguides equipped with the reflection surface that can be fabricated from one substrate can be increased, and the production cost can be easily lowered.

What is claimed is:

1. An information recording/reproduction apparatus utilizing near-field light, comprising: a light source for generating light; a suspension arm; a flexure fixed to the suspension arm; a near-field optical head fixed to the flexure and having a minute aperture formed therein; a substantially rod-like optical waveguide having a core and a clad for conveying the light emitted by the light source through the core; a reflection surface comprised of a terminal end of the clad located beyond a terminal end of the core of the optical waveguide opposite the light source for irradiating light projected from the terminal end of the core to the near-field optical head; and a light reception portion for receiving scattered light caused by an interaction between the minute aperture and a recording medium disposed proximate the near-field optical head; wherein the near-field optical head has a lens formed on a surface thereof different from a surface on which the minute aperture is formed for focusing light received from the reflection surface onto the minute aperture; and wherein the terminal end of the core is located at an intermediate part of the optical waveguide so that the clad extends beyond the terminal end of the core and terminates at the reflection surface.

2. An information recording/reproduction apparatus according to claim 1; wherein the reflection surface is a plane having an angle of about 45 degrees with respect to the terminal end of the core of the optical waveguide.

3. An information recording/reproduction apparatus according to claim 1; wherein the terminal end of the core is shaped to form a lens.

4. An information recording/reproduction apparatus according to claim 1; wherein the reflection surface is a plane formed to increase an expansion angle of a luminous flux projected from the terminal end of the core.

5. An information recording/reproduction apparatus according to claim 2; wherein the reflection surface is a plane formed to increase an expansion angle of a luminous flux projected from the terminal end of the core.

6. An information recording/reproduction apparatus according to claim 3; wherein the reflection surface is a plane formed to increase an expansion angle of a luminous flux projected from the terminal end of the care.

7. An information recording/reproduction apparatus according to claim 1; wherein the flexure supports the optical waveguide.

8. An information recording/reproduction apparatus according to claim 1; wherein the lens comprises a Fresnel lens.

9. An information recording/reproduction apparatus according to claim 1; wherein the optical waveguide is an optical fiber having a transparent layer formed thereon provided with the reflection surface.

10. A near-field optical head comprising: a support member; a minute structure formed on the support member for interacting with a recording medium via near-field light; and an optical waveguide formed on the support member for guiding light between a light source and the minute structure and having a core f or conveying light, a clad surrounding the core, and a reflective surface comprised of an end face of the clad, the core having an end face facing the reflective surface and terminating at an intermediate portion of the optical waveguide so that it is spaced apart from the reflective surface so that light traveling through the optical waveguide is projected from the end face of the core, diverged by the clad and irradiated onto the reflective surface and is reflected by the reflective surface toward the minute structure; wherein information is recorded to and/or read from the recording medium based on the scattering of near-field light between the recording medium and the minute structure while the near-field optical head is positioned over the surface of the recording medium.

11. A near-field optical head according to claim 10; wherein the minute structure comprises a minute aperture formed in the support member.

12. A near-field optical head according to claim 11; wherein the minute aperture has a size equal to or smaller than a wavelength of light.

13. A near-field optical head according to claim 10; wherein the reflective surface is a plane having an angle of about 45 degrees with respect to the core of the optical waveguide.

14. A near-field optical head according to claim 10; wherein the reflective surface is a plane formed to increase an expansion angle of a luminous flux projected from the end face of the core.

15. An information storage device having a recording head, a suspension arm for supporting the recording head relative to a recording medium, and a flexure linking the recording head to the suspension arm; wherein the recording head comprises the near-field optical head according to claim 10.

* * * * *